United States Patent [19]
Maruyama

[11] Patent Number: 5,121,978
[45] Date of Patent: Jun. 16, 1992

[54] IMAGE BLUR COMPENSATING TELEPHOTOGRAPHIC LENS

[75] Inventor: Koichi Maruyama, Tokyo, Japan

[73] Assignee: Asahi Kogaku Kogyo Kabushiki Kaisha, Tokyo, Japan

[21] Appl. No.: 437,823

[22] Filed: Nov. 17, 1989

[30] Foreign Application Priority Data

Nov. 17, 1988 [JP] Japan .................. 63-290590

[51] Int. Cl.⁵ .................. G02B 9/64; G02B 27/64
[52] U.S. Cl. .................. 359/557; 359/745
[58] Field of Search .................. 350/454, 500

[56] References Cited

U.S. PATENT DOCUMENTS 4,844,602  7/1989  Kitagishi et al. .................. 350/500

FOREIGN PATENT DOCUMENTS 63-201622  8/1988  Japan .
0201623    8/1988  Japan .................. 350/454
63-201624  8/1988  Japan .
63-202714  8/1988  Japan .

OTHER PUBLICATIONS

Copy of English language abstract of JP63-201,623.
Copy of English language abstract of JP 63-201,624.
Copy of English language abstract of JP 63-201,622.
Copy of English language abstract of JP 63-202,714.

Primary Examiner—Bruce Y. Arnold
Assistant Examiner—Rebecca D. Gass
Attorney, Agent, or Firm—Sandler, Greenblum & Bernstein

[57] ABSTRACT

An image blur compensating telephotographic lens has four lens groups. The four lens groups comprise a first lens group having a positive power, a second lens group having a negative power, a third lens group having a positive power, and a fourth lens group having a negative power arranged in this order from an object side. In one embodiment, the telephotographic lens has a lens moving mechanism for moving the second lens group in a direction vertical to the optical axis in order to compensate for an image blur when a photograph is taken. In another embodiment, the telephotographic lens has a lens moving mechanism for moving the third lens group in a direction vertical to the optical axis in order to compensate for an image blur when a photograph is taken.

11 Claims, 16 Drawing Sheets

FIG. I

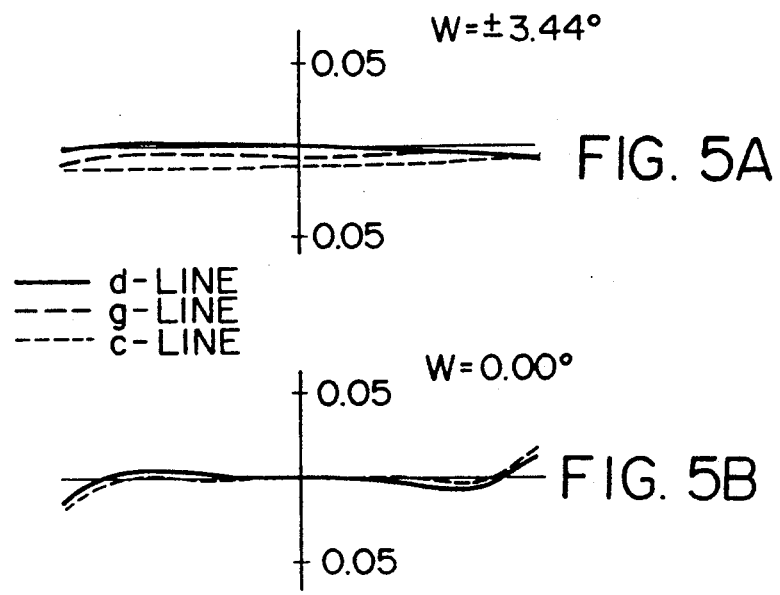
FIG. 5A
FIG. 5B
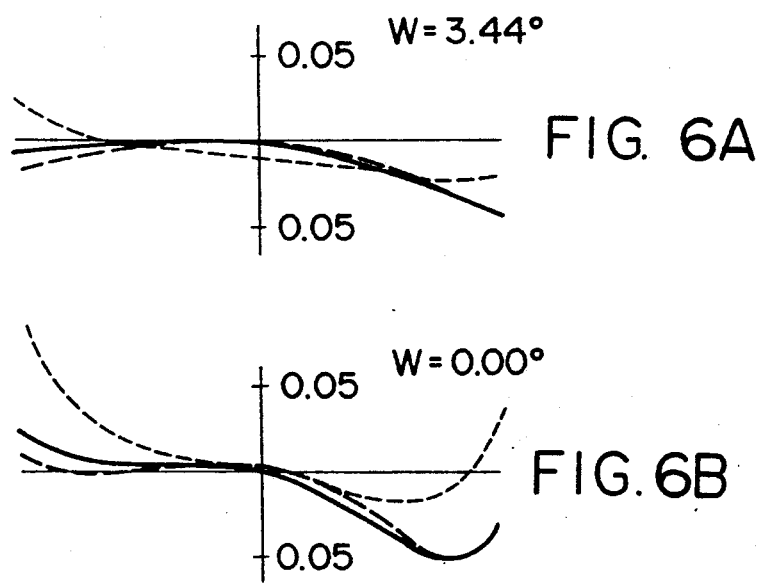
FIG. 6A
FIG. 6B
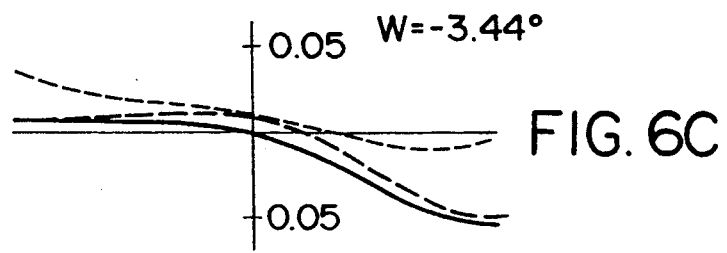
FIG. 6C

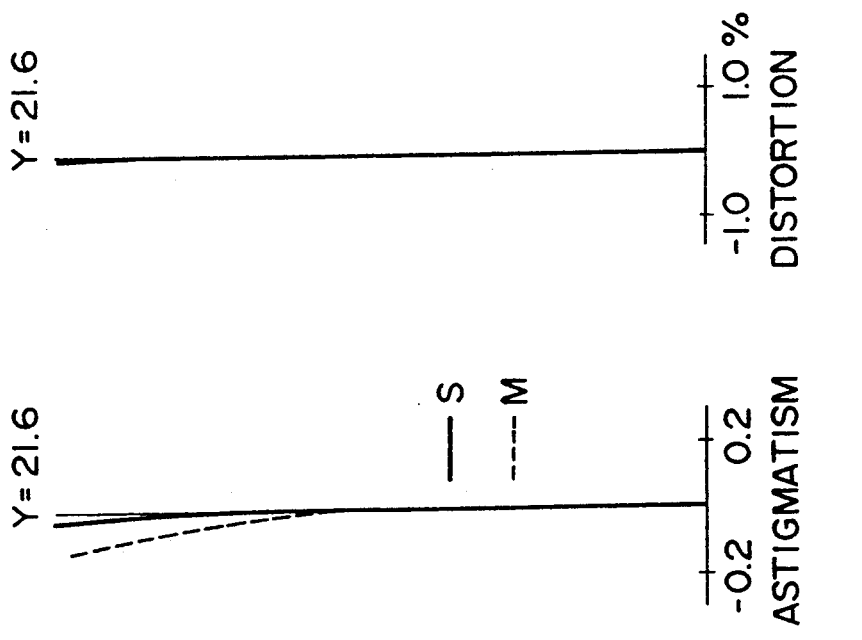
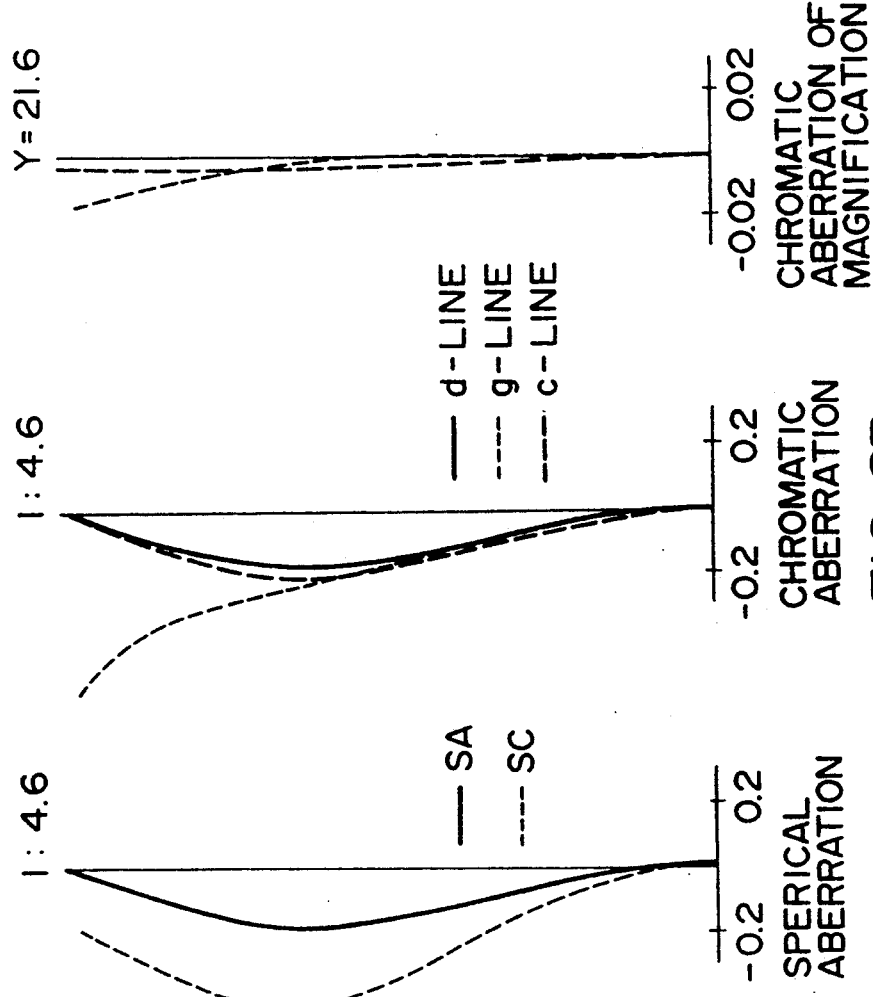

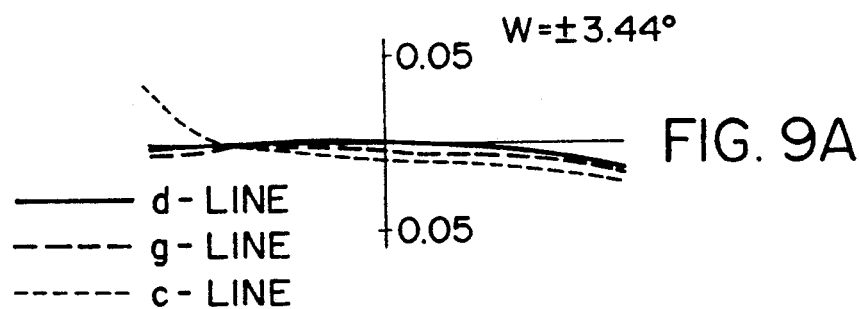
FIG. 9A
FIG. 9B
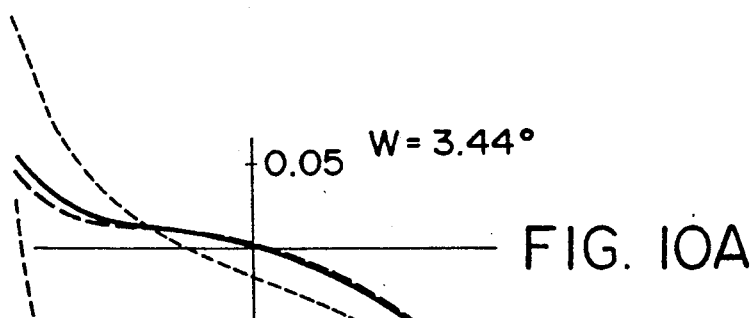
FIG. 10A
FIG. 10B
FIG. 10C

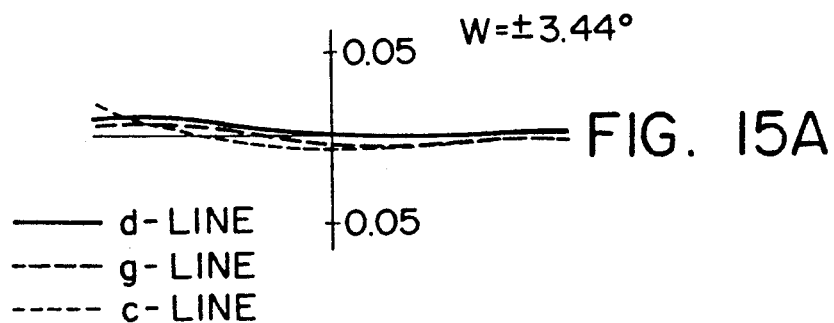
FIG. 15A
FIG. 15B
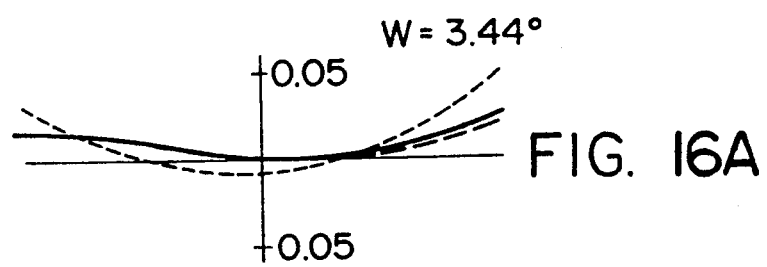
FIG. 16A
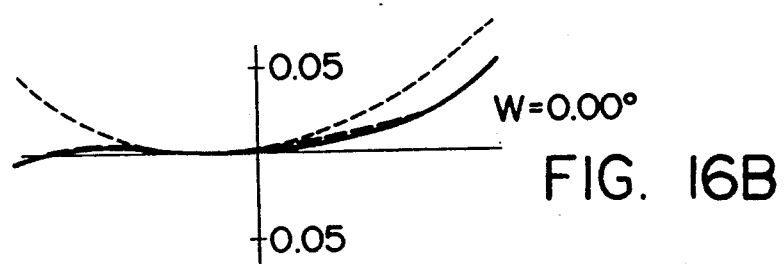
FIG. 16B
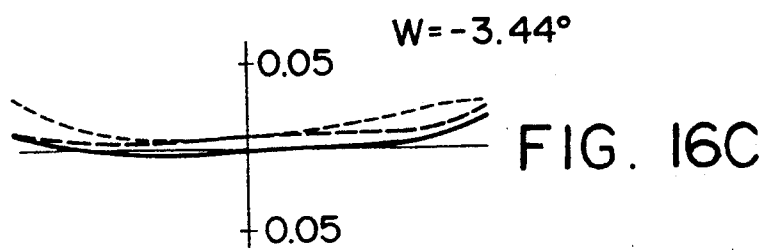
FIG. 16C

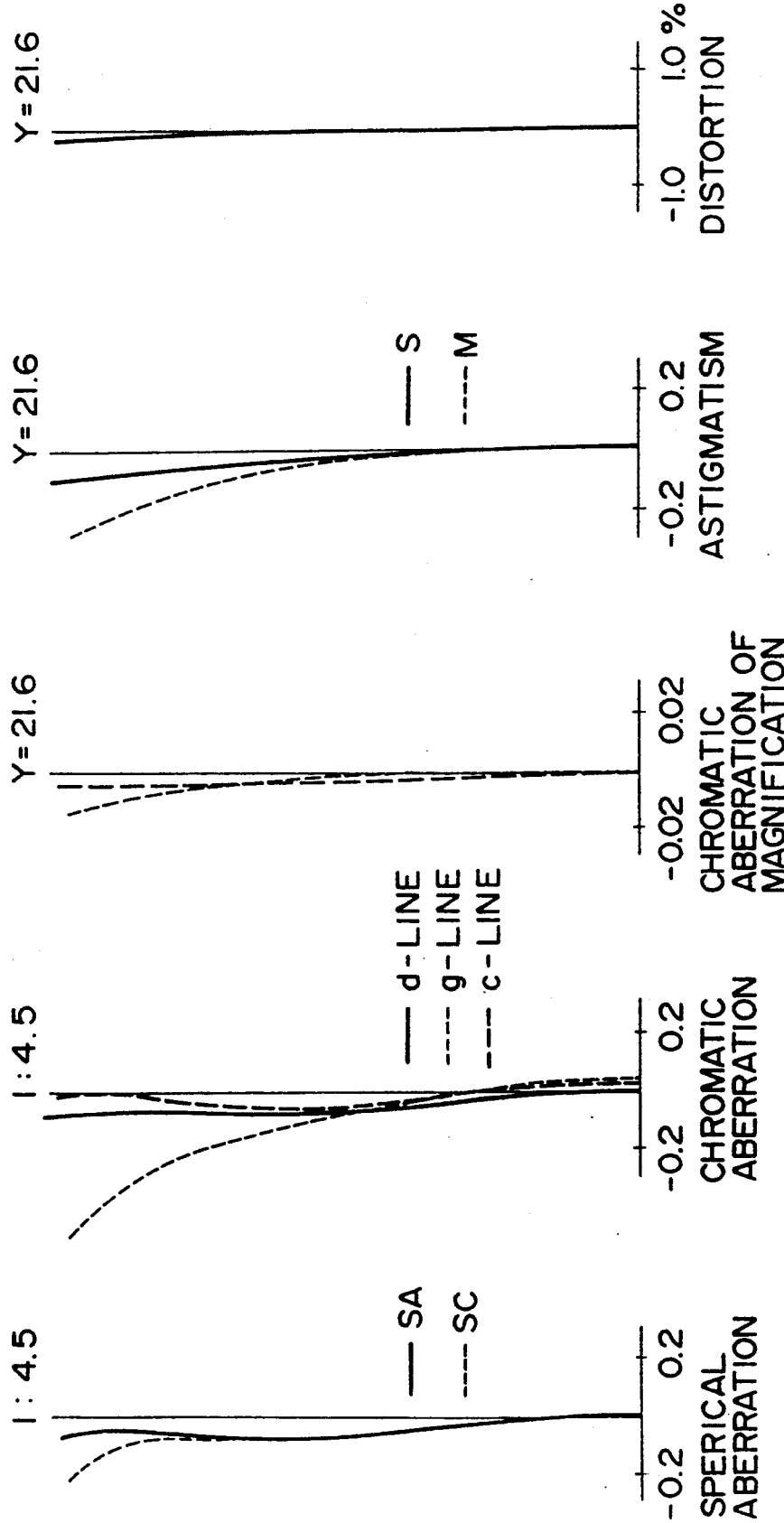

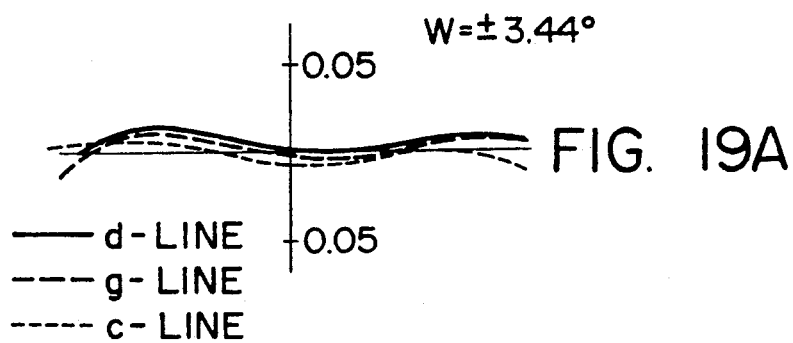
FIG. 19A
FIG. 19B
—— d-LINE
--- g-LINE
----- c-LINE
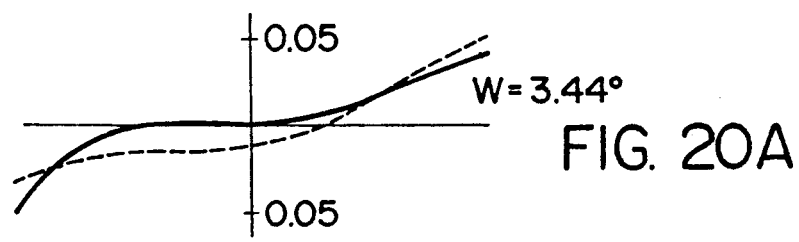
FIG. 20A
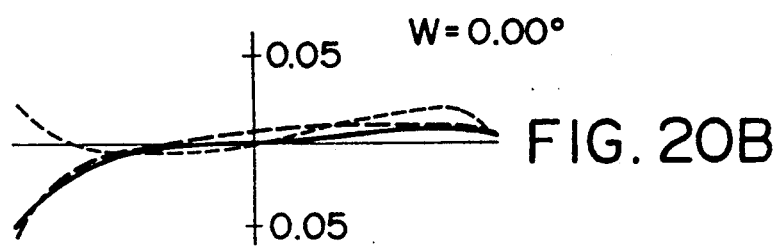
FIG. 20B
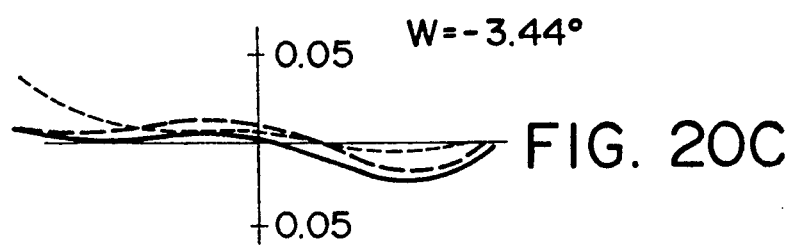
FIG. 20C

IMAGE BLUR COMPENSATING TELEPHOTOGRAPHIC LENS

BACKGROUND OF THE INVENTION

1. Field of the Invention

This invention relates to a taking lens that is capable of preventing the deterioration of an image caused by an accidental inclination or so-called camera shake when a picture is being taken.

2. Description of the Prior Art

When taking a picture from a moving automobile or airplane, or when a long focus lens is used, a significant image deterioration, caused by a camera shake, tends to occur. Heretofore, many proposals have been made to provide means for compensating for an image blur caused by the camera shake.

In the prior art, an image blur, due to a camera shake, is compensated for, by employing a taking lens system which includes a prism. The prism is inclined with respect to the optical axis in order to deflect an optical path to an image surface.

According to the prior art, however, it is necessary that a plurality of prisms be provided in order to thoroughly compensate for an image blur caused by the camera shake or otherwise the taking lens is used in combination with a wide converter. Therefore, there arises such problems as that the control is complicated and the apparatus becomes bulky. Also, it has such an inconvenience as that a chromatic aberration is inevitable to be generated when a prism is used.

In order to solve such problems inherent in an apparatus using a prism, some proposals have been made in which an image blur is compensated by moving a part of a lens group in the vertical direction with respect to the optical axis.

Those proposals are as follows, for example.

Japanese Patent Early Laid-open Publication No. Sho 63-201623 discloses a lens system in which a lens group nearest to an image in the lens system is moved. Japanese Patent Early Laid-open Publication No. Sho 63-201624 discloses a lens system in which an extender system disposed on the side of an image of a master lens is moved. Similarly, Japanese Patent Early Laid-open Publication No. Sho 63-201622 discloses a lens system in which an afocal system is disposed on the side of an object of a master lens or on the side of an image of the master lens is moved.

In general, when a lens group among a plurality of lens groups is moved in the vertical direction with respect to the optical axis as a compensating lens, if the moved amount of the lens group is represented by Y, a moved amount $\Delta Y$ of an image on an image surface caused by the movement of the lens group can be expressed by the equation:

$$\Delta Y = (-m_A + m_B) \cdot Y$$

wherein $m_A$ denotes a magnification composed by lens groups from the compensating lens group to the image surface, and $m_B$ denotes a magnification composed by lens groups on the side of an image to the compensating lens group.

Also, if a coefficient $\alpha$ regarding the compensation of movement of the image is defined in accordance with the following equations, the absolute value of the coefficient $\alpha$ is desirably small when the image blur is compensated by moving a part of the lens group:

$$Y = \alpha \cdot \Delta Y$$

$$\alpha = (-m_A + m_B)^{-1}$$

If the absolute value of the coefficient $\alpha$ is large, the outer diameter of a lens barrel becomes large in order to obtain a space for moving the lens therein and a movable area of an actuator.

Also, in order to prevent a reduction in the intensity of a marginal ray caused by a movement of the compensating lens group, the effective diameter of the compensating lens group itself must be large. In this case, a large power actuator is required in order to move a heavy compensating lens.

When an object is located at infinity, if a focal length of the lens group on the side of the object to the compensating lens group is represented by $f_A$ and a focal length from a lens nearest to the object to the compensating lens group is represented by $f_B$, the magnifications $m_A$ and $m_B$ can be expressed by the following equations:

$$m_A = f/f_A$$

$$m_B = f/f_B$$

Accordingly, the compensation coefficient $\alpha$ can be expressed as follows:

$$\alpha = \frac{1}{-(f/f_A) + (f/f_B)}$$

Next, the above equation is applied to the afore-mentioned three Japanese Publications. As the lens system described in Japanese Patent Early Laid-open Publication No. Sho 63-201623 is constructed such that a compensating lens group is disposed behind a generally afocal lens, the following equations are obtained:

$$f/f_A \approx 0, \; f/f_B \approx 1$$

and the coefficient becomes $\alpha \approx 1$. In a lens system of a type in which the lens group behind the afocal system is served as a compensating lens group, an equation of $\alpha \approx 1$ can always be obtained.

In the lens system described in Japanese Patent Early Laid-open Publication No. Sho 63-201624, $f/f_A$ becomes an image magnification of the extender system itself and becomes as follows:

$$f/f_B \approx 1$$

Therefore, unless the magnification of a rear attachment lens exceeds 2, a relation of $|\alpha| < 1$ cannot be satisfied. When the compensating lens group is disposed on the side nearest to the image, in order to satisfy a relation of $|\alpha| \leq 0.5$, it is necessary that the focal length $f_A$ of the lens group on the side of the object than the compensating lens group is made smaller than $-f$ or otherwise bigger than $f/3$.

These values are very far away from values which a usual telephotographic lens has. If the lens group on the side of the object is a strong diverging lens group, there occurs an increased total length of the lens system, eclipse of marginal ray caused by the large diameter of an exit pupil, etc. On the contrary, if the lens group on the side of the object is a strong convergent lens group, it is inevitable that the chromatic aberration and curvature of field are increased.

The lens system described in Japanese Patent Early Laid-open Publication No. Sho 63-201622 is constructed such that an attachment lens including a compensating lens group is mounted on a master lens. In this case, among lens groups comprising the attachment lens, even if the lens group on the side of the object is the compensating lens group, or even if the lens group on the side of a main lens is the compensating lens group, α becomes a value obtained by dividing the focal length of the lens group on the side of the object of the attachment lens by the focal length of the whole system. The lens system shown in this Publication includes the attachment lens on the side of the object of the master lens, and the lens group on the side of the master lens in the attachment lens is served as the compensating lens.

According to this construction, although the coefficient α becomes as small as 0.6, affection which the chromatic aberration generated in the compensating lens group renders the chromatic aberration of the whole system large. Therefore, in order to secure a sufficient performance able to be used as a taking lens, it is necessary to compensate the chromatic aberration using four pieces of lens or more. As a result, it is unavoidable that the whole lens system becomes large.

SUMMARY OF THE INVENTION

The present invention has been accomplished in view of the above problems. It is therefore the object of the present invention to provide an image blur compensating telephotographic lens in which an absolute value of α is made small in order to provide a suitable construction of a single telephotographic lens in which the aberrations are accurately compensated.

An image blur compensating telephotographic lens according to the present invention intends to remove an adverse affection of an image blur caused by a camera shake by providing a unique construction of a telephotographic lens, comprising 4 lens groups of "+ − + −" in which an intermediate second or third lens group is moved in a direction perpendicular to the optical axis.

BRIEF DESCRIPTION OF THE DRAWINGS

FIGS. 1 through 6 show a first embodiment of an image blur compensating telephotographic lens, in which FIG. 1 is a schematic view of a lens that is focused on an object which is located at infinity, FIGS. 2A–2E are a schematic view showing an aberration of the lens, FIG. 3 is a schematic view of a lens focused on an object which is located at the shortest distance, FIG. 4 is a schematic view of a lens in the state where a second lens group is moved in the state of FIG. 1, and FIGS. 5A, 5B and 6A–6C are schematic views showing a transverse aberration before and after an inclination of the lens system.

FIGS. 7 through 10 show a second embodiment of the present invention, in which FIG. 7 is a schematic view of a lens that is focused on an object which is located at an infinity point, FIGS. 8A–8E are a schematic view showing an aberration thereof, and FIGS. 9A, 9B and 10A–10C are schematic views showing a transverse aberration before and after an inclination of the lens system.

FIGS. 11 through 16 show a third embodiment of an image blur compensating telephotographic lens, in which FIG. 11 is a schematic view of a lens focused on an object which is located at an infinity point, FIGS. 12A–12E are a schematic view showing an aberration of the lens that is, FIG. 13 is a schematic view of a lens focused on an object which is located at the nearest distance, FIG. 14 is a schematic view of a lens which is in the state where a third lens group is moved in the state of FIG. 11, and FIGS. 15A, 15B and 16A–16C are schematic views showing a transverse aberration before and after an inclination of the lens.

FIGS. 17 through 20 show a fourth embodiment of the present invention, in which FIG. 17 is a schematic view showing a lens focused on an object which is located at an infinity point, FIGS. 18A–18E are a schematic view showing an aberration thereof, and FIGS. 19A, 19B and 20A–20C are schematic views showing a transverse aberration before and after an inclination of the lens.

DETAILED DESCRIPTION OF THE EMBODIMENTS

Figure 1:
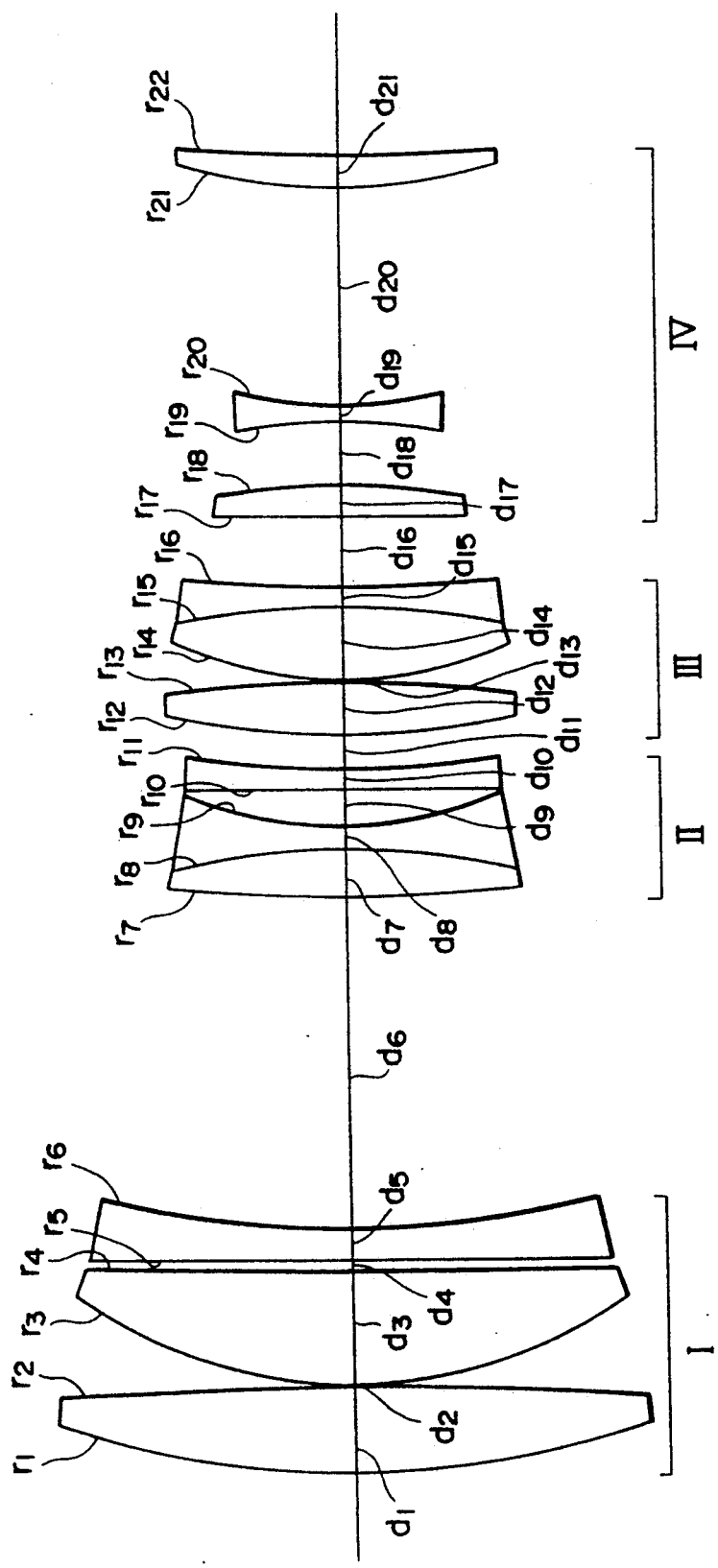
Figure 2:
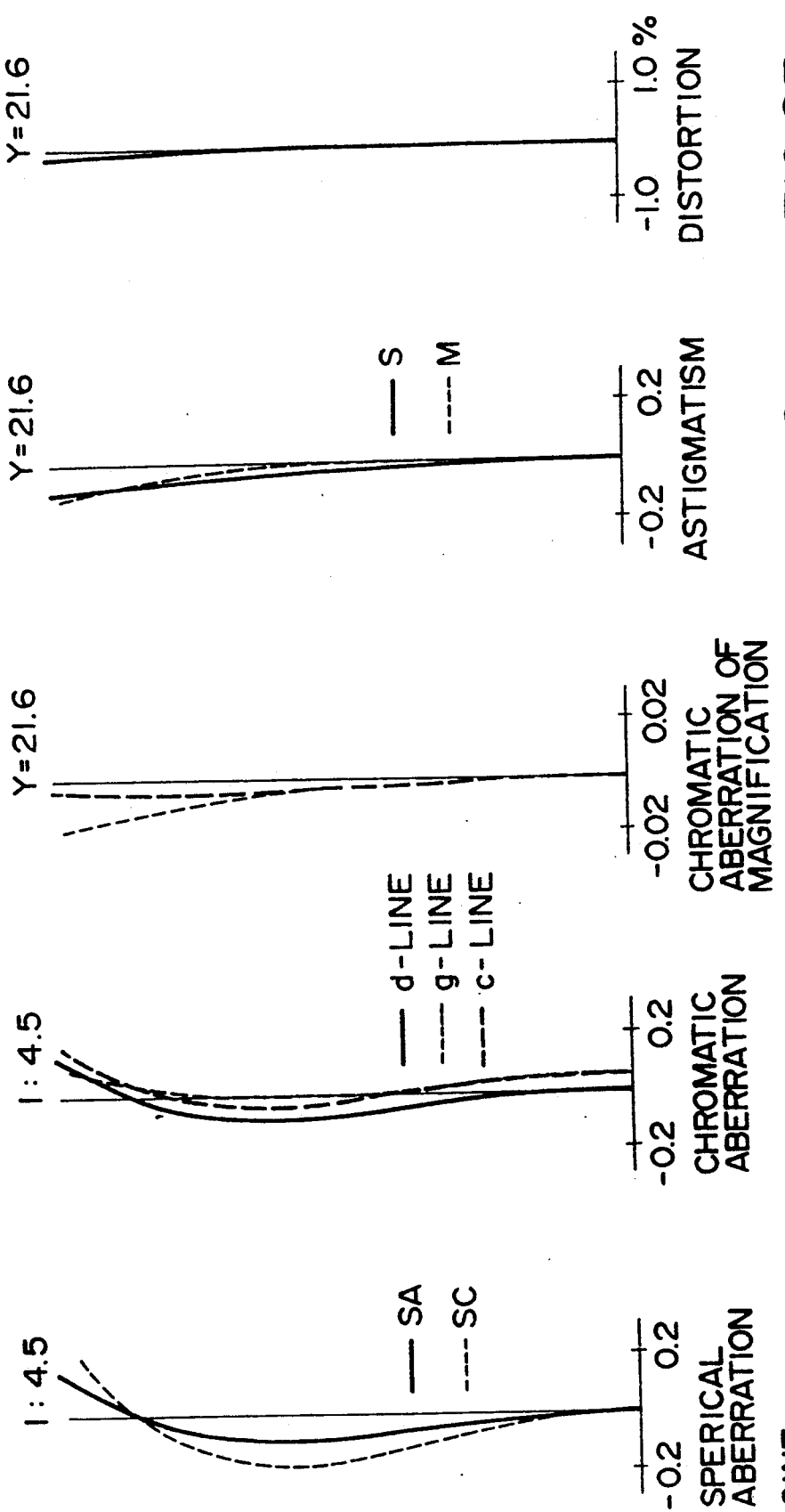

The embodiments of the present invention will be described hereinafter with reference to the accompanying drawings.

Each of the embodiments comprises a 4 lens group structure of the "+ − + −" type. Examples 1 and 2 are of the type in which a second lens group is moved in the direction vertical to the optical axis in order to compensate for an image blur, whereas examples 3 and 4 are of the type in which a third lens group is moved in the direction vertical to the optical axis in order to compensate for an the image blur.

As the second lens group has a negative power and the third lens group has a positive lens group, the moving direction of the compensating lens groups of the first and second embodiments is opposite to the moving direction of the third and fourth embodiments when the whole lens system is inclined in the same direction.

The fourth lens group is a group which has a magnification for making the focal length of the whole system a target value.

Examples 1 and 2 will be described under CASE 1 and examples 3 and 4 will be described under CASE 2.

CASE 1

The first embodiment of the present invention will be described with reference to FIG. 1.

When a second lens group II serves as a compensating lens group, it is desirable to satisfy the following relations:

$$1.5 < f/f_1 \quad (1)$$

$$-f/f_1 < f/f_{12} < 0 \quad (2)$$

wherein $f_1$ denotes a focal length of a first lens group I, $f_{12}$ denotes a composite focal length of the first and the second lens groups I and II, and f denotes a focal length of the whole system.

Relation (1) is a conditional expression in order to make the whole length and the second and the third lens groups II and III small.

If $f/f_1$ is less than 1.5, the distance between the first and the second lens groups I and II becomes too large and the total length of the lens system becomes too long. Moreover, the height of an incident light to the second lens group II becomes high. Accordingly, it is necessary to make the diameter of the second lens group II large. Also, if $f/f_1$ is less than 1.5, it is necessary to set a diverging angle of a light flux after the light flux is emitted from the second lens group II in order to make the coefficient α small. Accordingly, it becomes necessary to make the diameter of a third lens group III large.

Relation (2), in combination with relation (1), defines the lower limit of the change in image magnification caused by the second lens group II.

If $f/f_{12}$ in relation (2) is more than 0, a moving amount of the second lens group II becomes large in order to compensate for the image blur and a space for moving the lens system becomes large. In addition, the burden on an actuator is increased. If the moving amount is made small, the power of the first lens group I becomes excessively large.

On the other hand, if $f/f_{12}$ in relation (2) is less than $-f/f_1$, an aberration compensation is difficult in the second lens group II and the performance deterioration is large when the compensating lens group is moved. Therefore, a favorable performance as a taking lens cannot be ensured.

If the conditions of the above relations (1) and (2) are satisfied, when an image blur occurs due to a camera shake, the image blur can be compensated by moving the second lens group II in the direction vertical to the optical axis. And the moved amount is 0.4 times of the image blur amount or less.

Also, if the second lens group II comprises one positive lens piece and two negative lens pieces, it is desirable to satisfy the following relation:

$$-0.5 < f/R_{2-1} < 4.0 \tag{3}$$

wherein $R_{2-1}$ denotes the radius of curvature of a surface on the side nearest to the object in the second lens group II.

Relation (3) shows the conditions for making an over spherical aberration generated in the second lens group II small and restraining an occurrence of a high-order aberration caused by a convex surface adapted to offset such over spherical aberration.

The compensation of an aberration of the second lens group II is important, because in the case that the second lens group II has a residual spherical aberration, when this lens group is moved, the coma aberration of the whole system is increased. In such a case, the lens group has a coma aberration, and when the lens group is moved, the curvature of field of the whole system is increased.

Although the second lens group II is a strong negative lens group as a whole, it is necessary to have a convex surface for generating a large under spherical aberration in order to compensate the spherical aberration. For this purpose, one piece of positive lens having a high refractive index is required.

Also, in order to secure a negative power, it becomes necessary to have two or more negative lens pieces.

However, if the convex surface for generating such a large under spherical aberration is disposed alone, a performance deterioration caused by the displacement when the lens system is built up becomes large. Therefore, it is desirable that the convex surface is cemented with the negative lens. In this case, the spherical aberration can be compensated at the cementing surfaces by making a difference in the refractive index by providing the following relation:

$$n_p > n_m + 0.5$$

wherein the refractive index of the positive lens to be cemented is represented by $n_p$ and the refractive index of the negative lens is represented by $n_m$.

The remaining negative lens comprising the second lens group II has a high refractive index in order to generate a negative power. It is desirable that the negative lens has a double concave surface in order to restrain a generation of the over spherical aberration. Also, this negative lens can be cemented with a positive lens in order to compensate for the chromatic aberration. In this case, it is no more required that the positive and negative lenses are different in refractive index.

The second lens group II and the third lens group III are disposed in such a manner as to be proximate to each other. If the distance between the second and third lens groups II and III is represented by $d_{23}$, it is desirable that the following relation is satisfied:

$$d_{23}/f < 0.1 \tag{4}$$

Relation (4) shows the conditions for maintaining the diameter of the third lens group III small and making the total length of the lens system short.

As long as there can be secured a space enough for accommodating an actuator for moving the second lens group II, the distance between the second and the third lens groups II and III is desirably as short as possible in order to make the lens system compact.

In this embodiment, the third lens group III is adapted to make the lens system compact by converting the diverging light flux from the second lens group II into a converging light flux.

The fourth lens group IV performs focusing by being moved in the direction along the optical axis as a group. In this way, when the focusing is performed by the fourth lens group IV, it is easy to adopt a method for performing it by a part of the lens group.

In a telephotographic lens, there has been adopted a method for performing the focusing by moving the whole lens system in the direction along the optical axis. According to this method, a change in performance is comparatively small from a distant view to a near distance.

However, according to this method, when the lens is focused at a near distance point, a feeding amount of the lens becomes very large. Accordingly, the limit on the side of the near distance cannot be set too small. Also, there is a problem in which a maintaining balance is broken by the movement of the center of gravity which occurs during a focusing operation.

In view of the above, it is possible to contemplate for adopting an internal focusing and a rear focus. However, in the case of a lens system of this embodiment, in order to move the second lens group II for the purpose of focusing, it is necessary that this lens group is moved in the direction along the optical axis and also in the direction vertical thereto. As a consequence, the lens moving mechanism becomes complicated.

Also, a distance change between the second and the third lens groups II and III means that an incident height of a marginal ray to the third lens group III becomes high at a point in time when the distance is widened. Therefore, the construction for performing the focusing by the third lens group III is also not desirable.

In view of the above problems, the fourth lens group IV is adapted to be a focusing lens.

EXAMPLE 1

Figure 3:
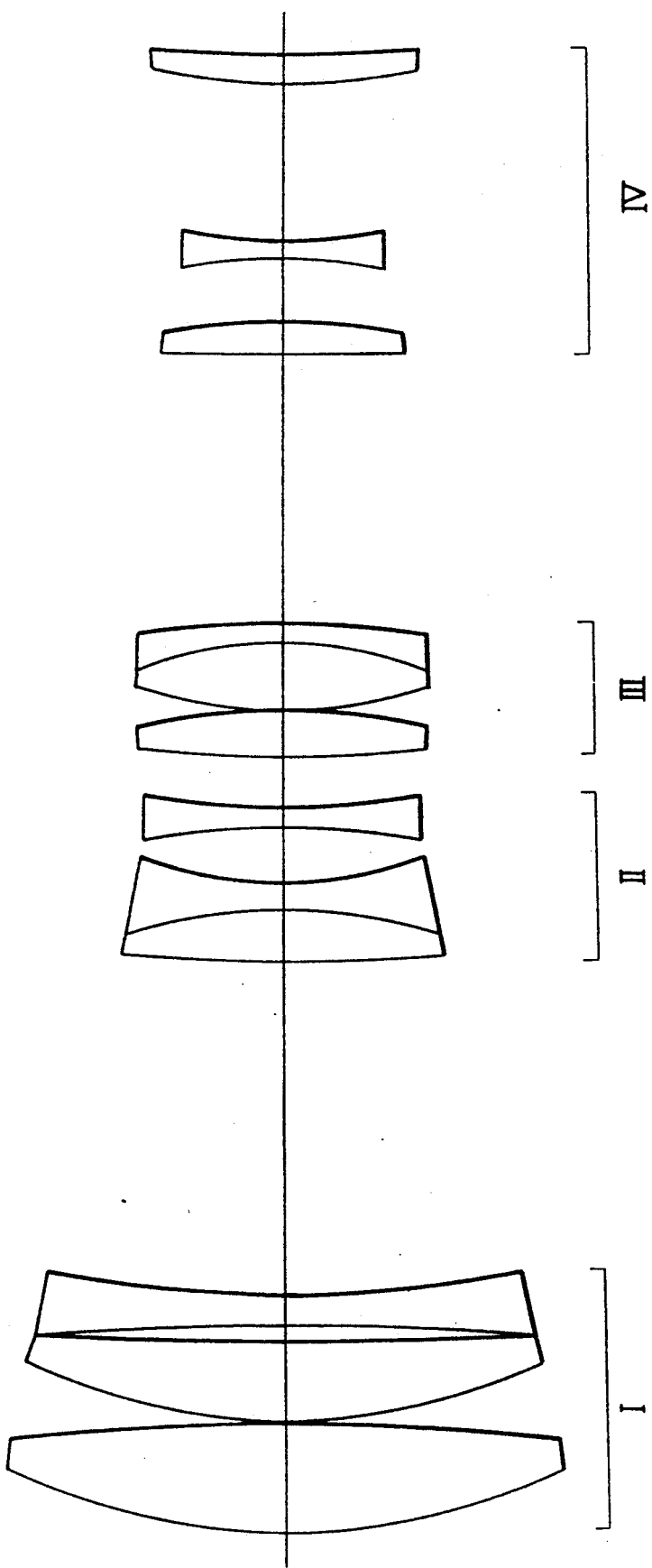

FIG. 1 shows a lens system according to the first example of the present invention, which is now focused on an object which is located at an infinity point, and FIG. 2A-2E show aberration in the state of FIG. 1. FIG. 3 shows the lens system now focused on an object which is located at a nearest distance.

Concrete numerical construction of this lens system is shown in Table 1.

In Table 1, FNO. stands for F number, f is a focal length of the whole system, W is a half angle of view, r is the radius of curvature of a lens, d the thickness of a lens and an air distance, n is a refractive index of the lens, and $\nu$ is an Abbe number of the lens.

TABLE 1

FNO. = 1:4.5    f = 300.00 mm    W = 4.1°

| SURFACE No. | r | d | n | $\nu$ |
| --- | --- | --- | --- | --- |
| 1 | 86.285 | 12.67 | 1.43387 | 95.2 |
| 2 | −300.841 | 0.30 | | |
| 3 | 77.245 | 9.41 | 1.49700 | 81.6 |
| 4 | 1174.462 | 1.60 | | |
| 5 | −515.938 | 3.70 | 1.72047 | 34.7 |
| 6 | 154.160 | 40.00 | | |
| 7 | 218.479 | 6.30 | 1.80518 | 25.4 |
| 8 | −67.389 | 3.50 | 1.67790 | 50.7 |
| 9 | 51.474 | 6.17 | | |
| 10 | −119.627 | 2.40 | 1.77250 | 49.6 |
| 11 | 106.859 | 6.00 | | |
| 12 | 161.676 | 5.30 | 1.51633 | 64.1 |
| 13 | −92.658 | 0.10 | | |
| 14 | 59.518 | 8.00 | 1.51454 | 54.7 |
| 15 | −48.475 | 2.20 | 1.80518 | 25.4 |
| 16 | −133.104 | 8.23 | | |
| 17 | 788.061 | 3.80 | 1.51633 | 64.1 |
| 18 | −76.596 | 7.32 | | |
| 19 | −68.399 | 2.10 | 1.75700 | 47.9 |
| 20 | 68.857 | 18.25 | | |
| 21 | 77.137 | 3.40 | 1.80518 | 25.4 |
| 22 | 204.620 | | | |

Conditional Expressions $f/f_1 = 2.1272$  (1)

$f/f_{12} = -0.8729$  (2)

$f/R_{2-1} = 1.3731$  (3)

$d_{23}/f = 0.020$  (4)

Coefficient $\alpha = -0.333$

Figure 4:
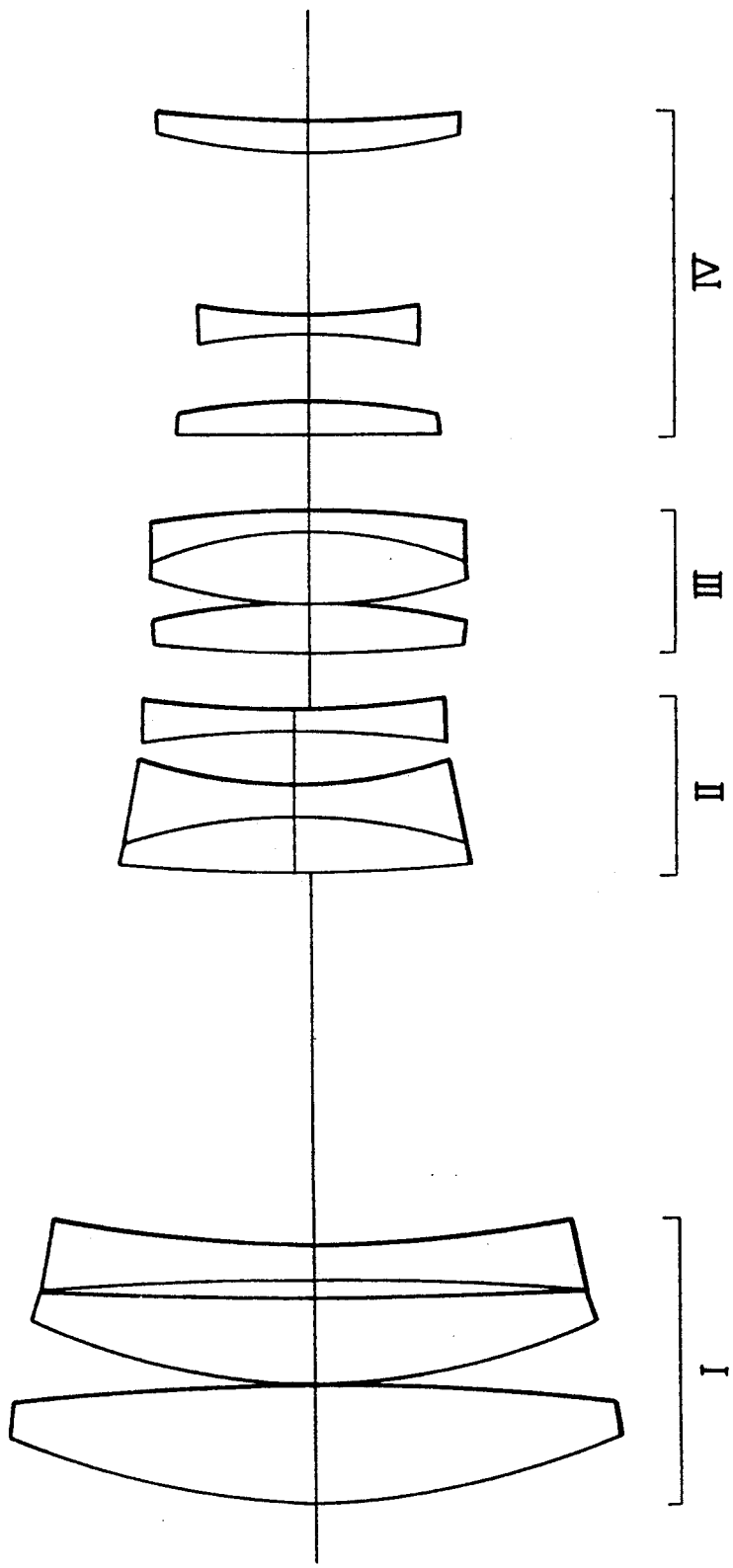

Given that an inclination of the whole lens system is 1°, a moving amount of the second lens group II in order to compensate for an image blur caused by the inclination becomes −1.745 mm. The "+" mark placed before the numerical figures showing the moving amount indicates a direction following the inclination of the lens system, while the "−" mark indicates a direction opposite thereto. FIG. 4 shows a state of the lens system after the second lens group II is moved for compensating the image blur.

FIGS. 5A, 5B and 6A-6C show a transverse aberration on the optical axis and a transverse aberration of a ray displaced by ±3.436° with respect to the optical axis from a primary point on the rear side of the lens system, FIGS. 5A and 5B show a state where the inclination is 0° (the state of FIG. 1), and FIGS. 6A-6C show a state where the amendment is effected with respect to an inclination of 1° (the state of FIG. 4). The "+" mark placed before the angle indicates a counterclockwise rotation in the figures.

Although the aberration appears on a concentric circle about the optical axis in the state before the second lens group II is moved, the aberration appears differently along the moving direction of the second lens group II after the second lens group II is moved in the direction vertical to the optical axis. Therefore, there are presented two illustrations for before-movement and three illustrations for after-movement.

EXAMPLE 2

Figure 7:
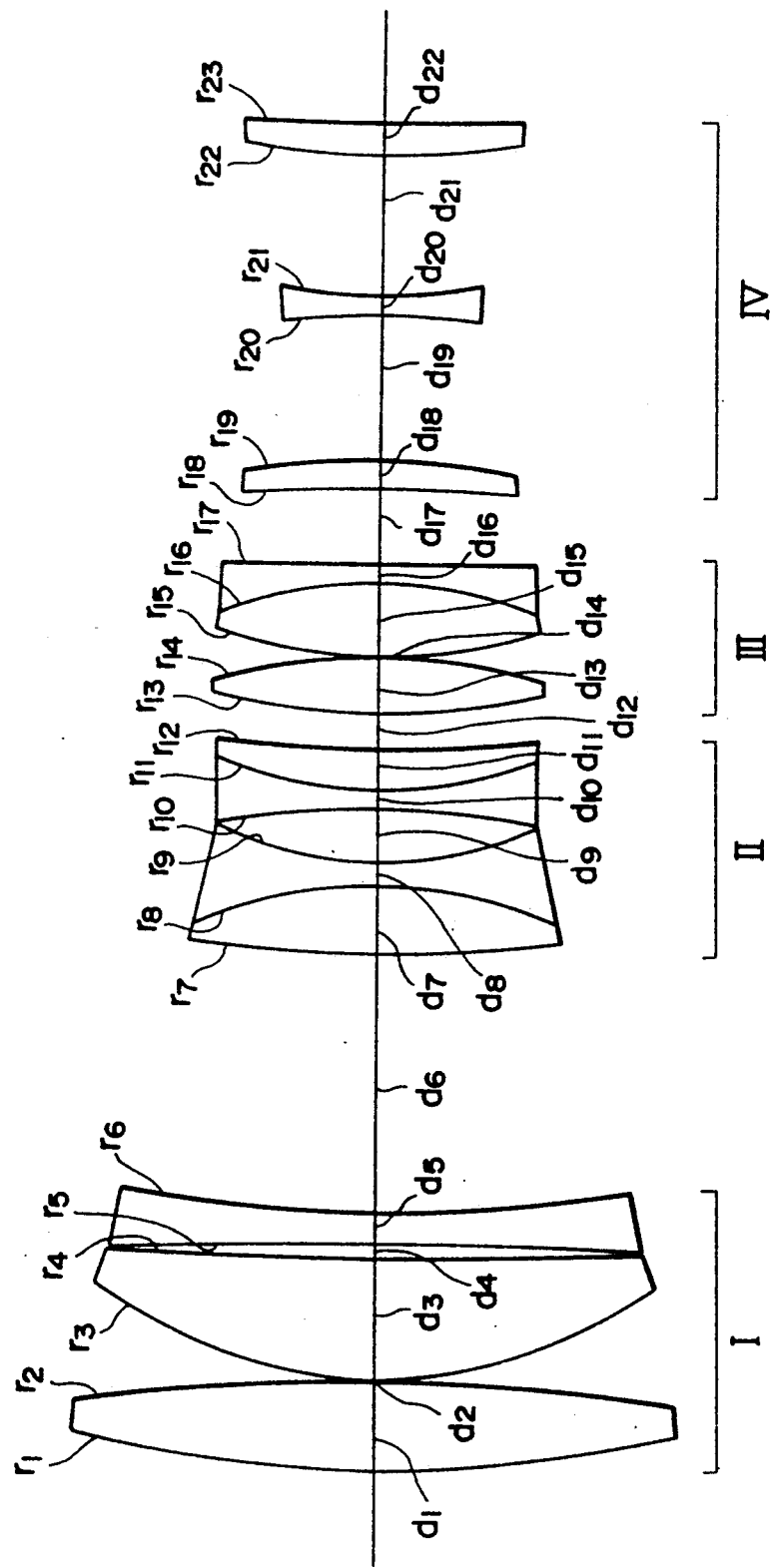

FIG. 7 is a schematic view showing the lens system according to the second example of the present invention focused on an object which is located at a remote infinity, and FIGS. 8A-8E are likewise a schematic illustration showing the aberration in the state of FIG. 7.

Concrete numerical constructions of this lens system is shown in Table 2.

TABLE 2

FNO. = 1:4.6    f = 300.00 mm    W = 4.1°

| SURFACE No. | r | d | n | $\nu$ |
| --- | --- | --- | --- | --- |
| 1 | 150.817 | 9.52 | 1.49700 | 81.6 |
| 2 | −243.416 | 0.30 | | |
| 3 | 52.898 | 13.06 | 1.43387 | 95.2 |
| 4 | 666.583 | 1.18 | | |
| 5 | −2219.802 | 3.70 | 1.83400 | 37.2 |
| 6 | 161.966 | 28.07 | | |
| 7 | 169.331 | 7.21 | 1.80518 | 25.4 |
| 8 | −54.247 | 2.80 | 1.72047 | 34.7 |
| 9 | 42.934 | 5.73 | | |
| 10 | −99.513 | 2.20 | 1.77250 | 49.6 |
| 11 | 49.976 | 4.17 | 1.75520 | 27.5 |
| 12 | 156.119 | 4.00 | | |
| 13 | 85.095 | 6.00 | 1.51633 | 64.1 |
| 14 | −67.519 | 0.10 | | |
| 15 | 66.155 | 7.84 | 1.54869 | 45.6 |
| 16 | −45.986 | 2.20 | 1.80518 | 25.4 |
| 17 | −786.383 | 8.04 | | |
| 18 | −202.454 | 2.96 | 1.48749 | 70.2 |
| 19 | −89.236 | 16.01 | | |
| 20 | −87.569 | 2.10 | 1.80400 | 46.6 |
| 21 | 64.485 | 15.23 | | |
| 22 | 81.820 | 3.70 | 1.80518 | 25.4 |
| 23 | 2118.245 | | | |

Conditional Expressions $f/f_1 = 2.4708$  (1)

$f/f_{12} = -1.0287$  (2)

$f/R_{2-1} = 1.7716$  (3)

$d_{23}/f = 0.013$  (4)

Coefficient $\alpha = -0.285$

Given that an inclination of the whole lens system is 1°, a moving amount of the second lens group II in order to compensate an image blur caused by the inclination becomes −1.497 mm. The transverse aberration in an inclined state of the lens system by 0° in Example 2 and the transverse aberration in a state where the image blur is compensated by moving the second lens group II with respect to the inclination of 1° are shown in FIGS. 9A, 9B and 10A-10C, respectively.

CASE 2

In a case that the third lens group III among the fourth lens group IV serves as the compensating lens, it is desirable to satisfy the following relations:

$$1.5 < f/f_1 \tag{5}$$

$$f/f_{12} < -0.2 \tag{6}$$

$$1.5 < f/f_{123} \tag{7}$$

wherein $f_1$ denotes a focal length of a first lens group I, $f_{12}$ denotes a composite focal length of the first and the second lens groups, $f_{123}$ denotes a composite focal length from the first lens group I to the third lens group III, and f denotes a focal length of the whole system.

Relation (5) is a conditional expression in order to make the whole length and the second and the third lens groups II and III small. If $f/f_1$ is less than 1.5, the distance between the first and second lens groups II and III becomes too large and the incident height of light to the second lens group II becomes high. As a result, the second lens group II becomes large in diameter.

The lower limits of relations (6) and (7) set the lower limit of an image magnification of the third lens group III rendered to an image magnification of the whole lens system. When exceeding these limits, the power of the third lens group III becomes too large to compensate the aberration, or otherwise a space for moving the lens system becomes large. In addition, the burden on an actuator is increased.

The second lens group II is a negative lens group for converting a converging light from the first lens group I having a positive power in order to make a telephotographic ratio small into a diverging light in order to increase the effect of an image blur compensating and making the same incident to the third lens.

Also, the third lens group III comprises at least two positive lens pieces and one negative lens piece. The lens nearest to the object is a double convex positive lens or a cemented double convex positive lens. If the radius of curvature of an object side surface is represented by $R_{3-1}$ and the radius of curvature of an image side surface is represented by $R_{3-2}$, it is desirable to satisfy the following relations:

$$2.0 < f/R_{3-1} < 5.0 \tag{8}$$

$$|R_{3-1}/R_{3-2}| < 0.9 \tag{9}$$

Relations (8) and (9) are conditional expressions for favorably compensating the spherical aberration in the third lens group III as a whole. Although the third lens group III as a whole is a strong positive lens, it is necessary to have a strong diverging surface for generating a large over spherical aberration. Also, as the chromatic aberration must be compensated, one negative lens piece having a high refractive index and high dispersion is required.

In order to restrain the spreading of the diverging light flux emitted from the second lens group II, the lens on the side of the second lens group II in the third lens group III is a double convex positive lens or a double convex cemented positive lens. By forming the surface on the side of the object into a strong convex surface for reducing a generation of under sperical aberration, relations (8) and (9) can be satisfied.

Also, the second and the third lens groups II and III are disposed in such a manner as to be proximate in the direction of the optical axis. If the distance between the second and third lens groups II and III is represented by $d_{23}$, it is desirable to satisfy the following conditions:

$$d_{23}/f < 0.1 \tag{10}$$

Relation (10) is a conditional expression for restraining the whole length of the lens system.

As long as there can be secured a space enough for accommodating an actuator for compensating an image blur, the distance between the second and the third lens groups II and III is desirably as short as possible in order to make the total length of the lens system compact.

EXAMPLE 3

The lens system according to the third example of the present invention is now described.

TABLE 3

| FNO. = 1:4.5 | f = 300.01 mm | | W = 4.1° |
|---|---|---|---|
| SURFACE No. | r | d | n | v |
| 1 | 110.730 | 9.77 | 1.49700 | 81.6 |
| 2 | −510.269 | 0.30 | | |
| 3 | 57.369 | 12.57 | 1.43387 | 95.2 |
| 4 | 1394.565 | 1.18 | | |
| 5 | 10136.539 | 3.70 | 1.83400 | 37.2 |
| 6 | 115.744 | 37.37 | | |
| 7 | 168.672 | 5.54 | 1.80518 | 25.4 |
| 8 | −89.513 | 2.80 | 1.72000 | 50.2 |
| 9 | 45.421 | 4.12 | | |
| 10 | 2561.735 | 2.20 | 1.77250 | 49.6 |
| 11 | 109.647 | 4.00 | | |
| 12 | 88.666 | 6.30 | 1.61800 | 63.4 |
| 13 | −147.726 | 0.10 | | |
| 14 | 46.879 | 8.31 | 1.51454 | 54.7 |
| 15 | −103.724 | 2.20 | 1.80518 | 25.4 |
| 16 | 202.199 | 7.64 | | |
| 17 | −4599.857 | 3.40 | 1.58144 | 40.7 |
| 18 | −78.370 | 6.80 | | |
| 19 | −71.385 | 2.10 | 1.77250 | 49.6 |
| 20 | 55.106 | 24.20 | | |
| 21 | 67.323 | 3.50 | 1.67270 | 32.1 |
| 22 | 215.688 | | | |

Figure 11:
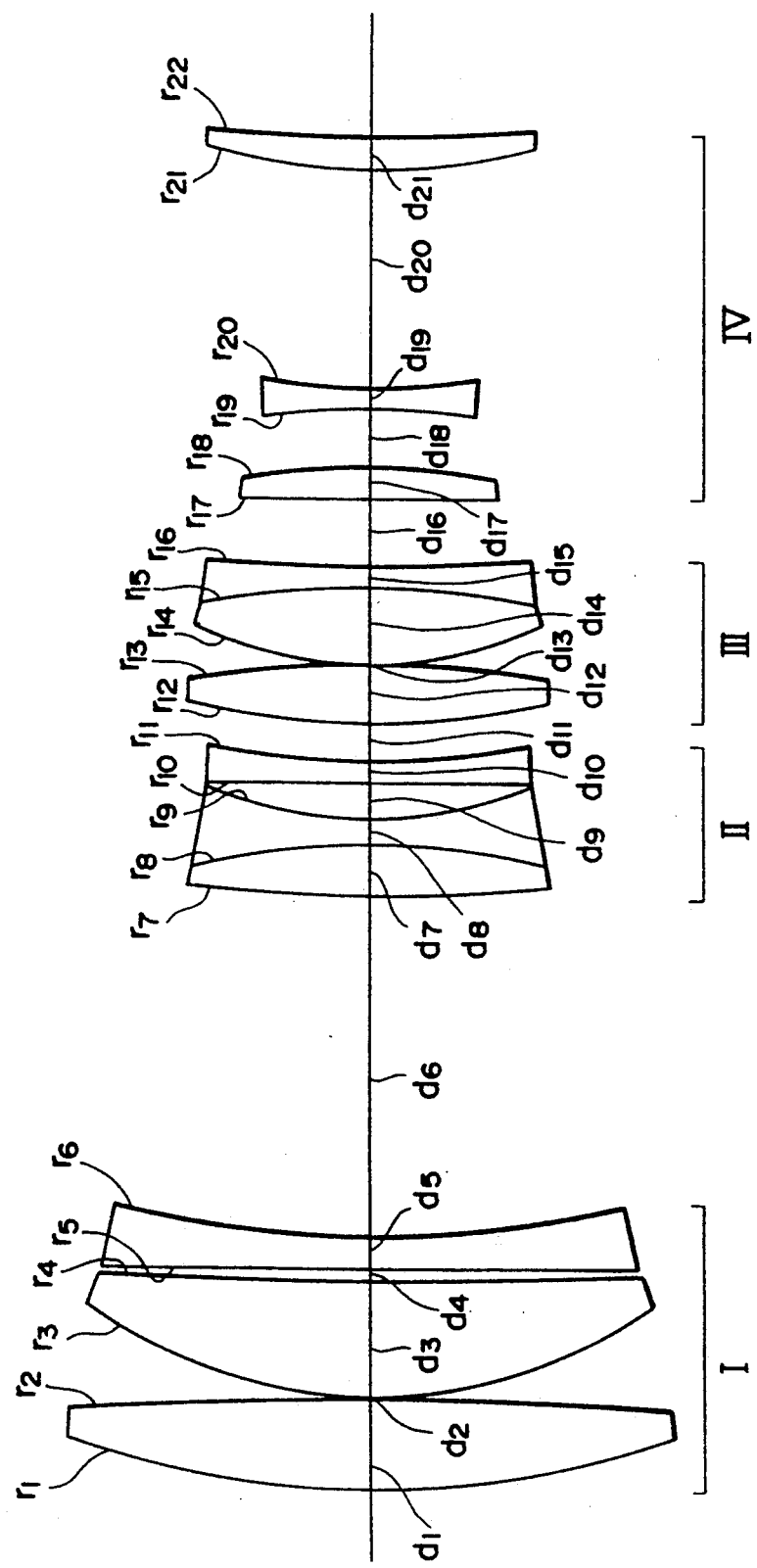
Figure 12:
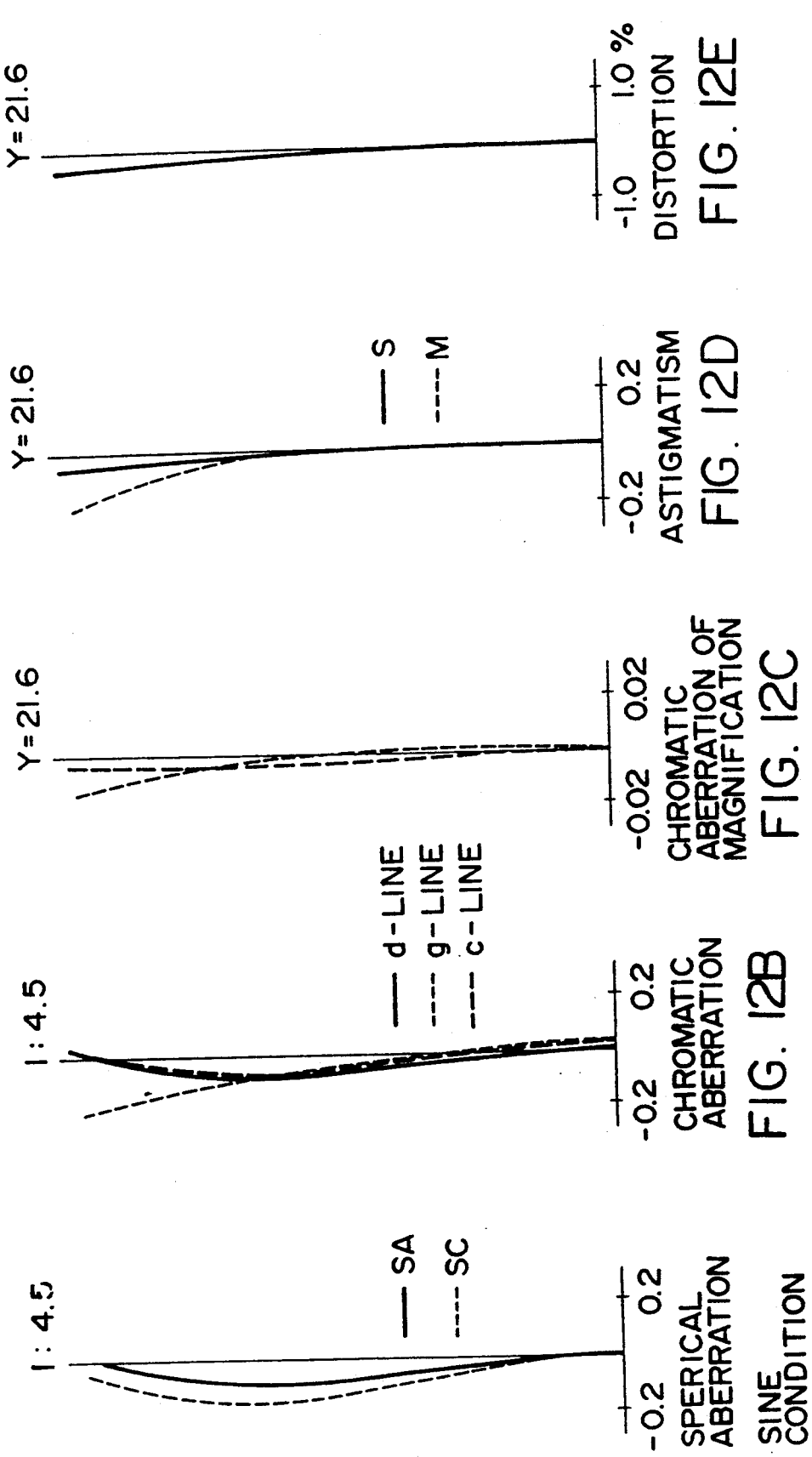
Figure 13:
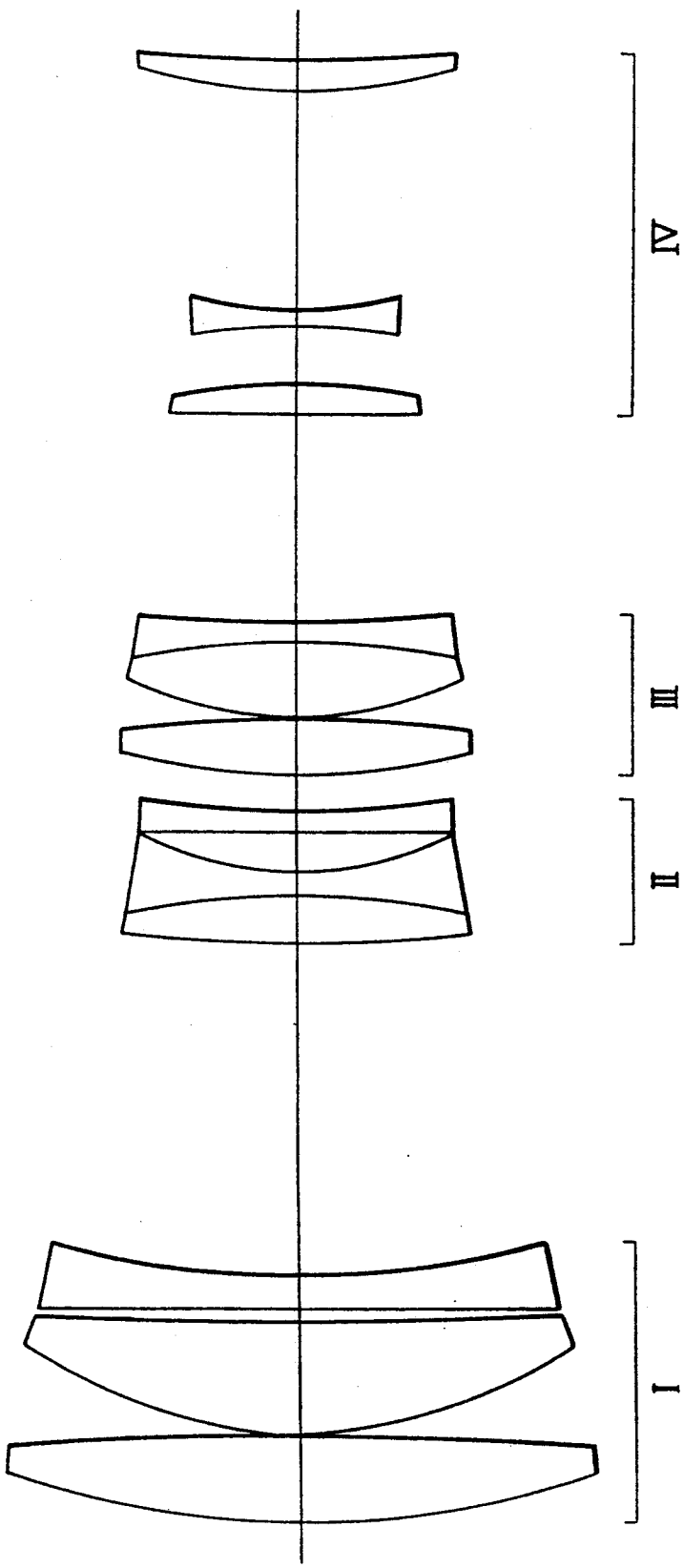

FIG. 11 shows a lens system according to the third example of the present invention, which is focused on an object which is located at an infinity point FIGS. 12A–12E show the aberration in the state of FIG. 11, and FIG. 13 shows the lens system focused on an object located at a nearest distance.

Concrete numerical construction of this lens system is shown in Table 3.

Conditional Expressions $$f/f_1 = 2.003 \tag{5}$$

$$f/f_{12} = 0.5547 \tag{6}$$

$$f/f_{123} = 1.9454 \tag{7}$$

$$f/R_{3-1} = 3.3834 \tag{8}$$

$$|R_{3-1}/R_{3-2}| = 0.6002 \tag{9}$$

$$d_{23}/f = 0.013 \tag{10}$$

Coefficient $\alpha = -0.40$

Figure 14:
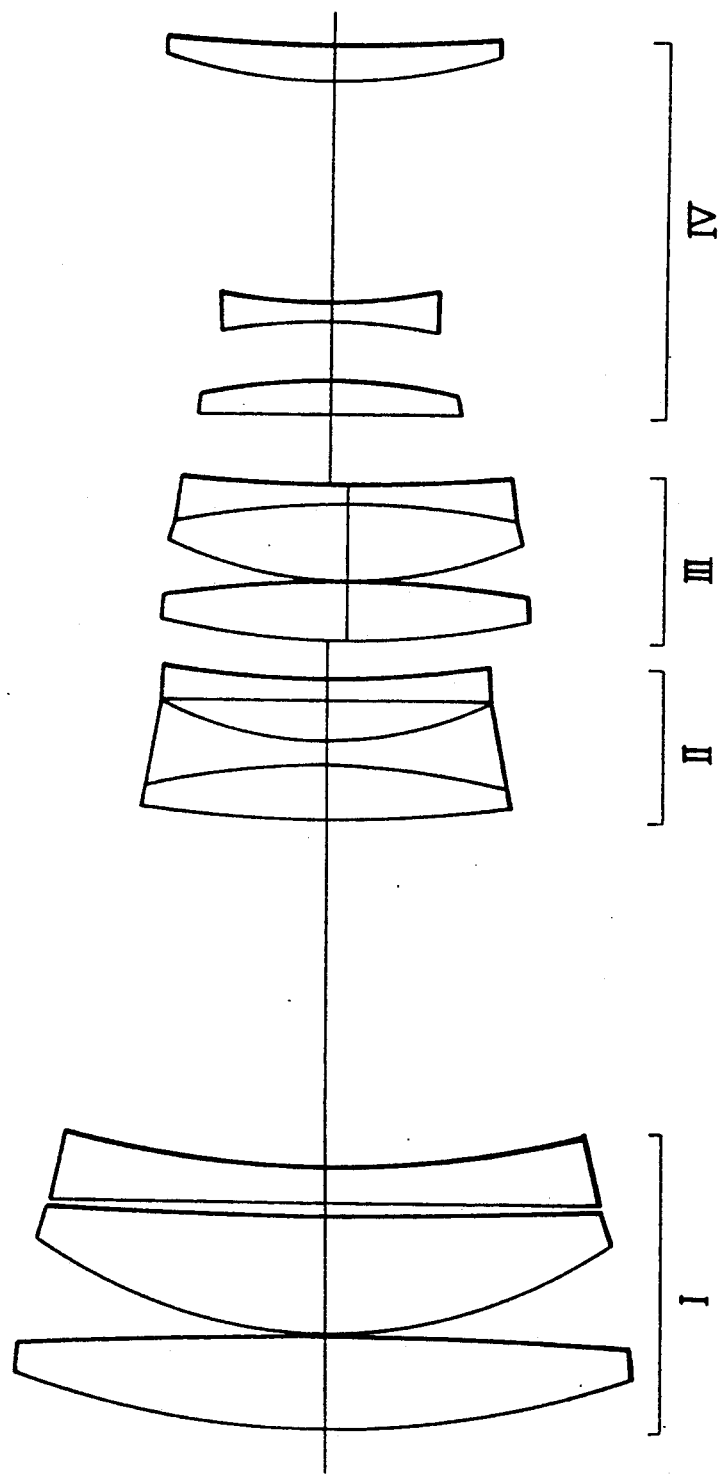

Given that an inclination of the whole lens system is 1°, a moving amount of the third lens group III in order to compensate for an image blur caused by the inclination is 2.092 mm. FIG. 14 shows a state after the compensation.

The transverse aberration in an inclined state of the lens system by 0° in Example 3 and the transverse aberration in a state where the image blur is compensated by moving the third lens group III with respect to the inclination of 1° are shown in FIGS. 15A, 15B and 16A-16C, respectively.

EXAMPLE 4

Figure 17:
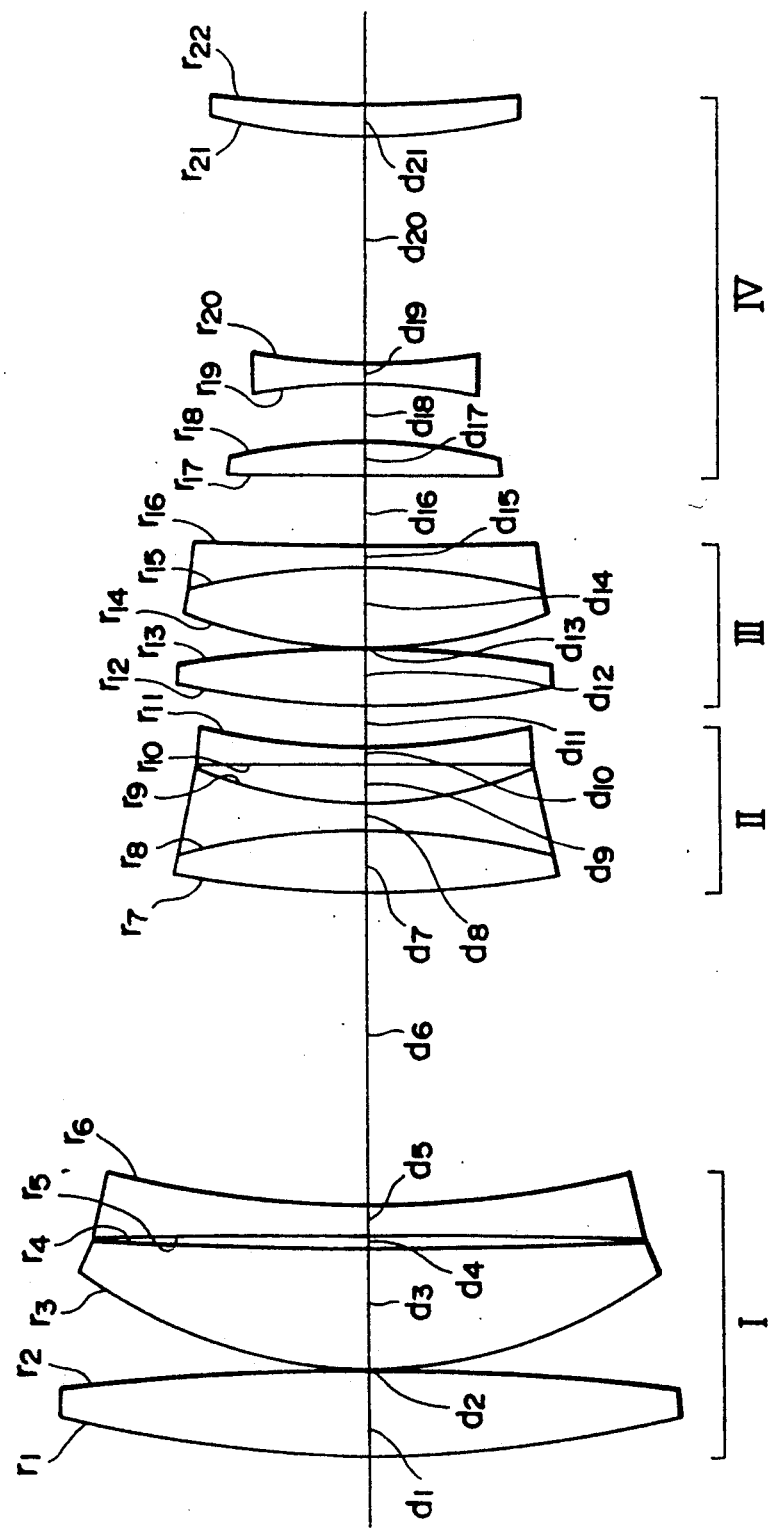

FIG. 17 shows a lens system according to the fourth example of the present invention, which is now focused on an object which is located point at infinity, and FIGS. 18A-18E show the aberration in the state of FIG. 17. Concrete numerical construction of Example 4 is shown in Table 4.

TABLE 4

FNO. = 1:4.5   f = 300.00 mm   W = 4.1°

| SURFACE No. | r | d | n | ν |
|---|---|---|---|---|
| 1 | 143.171 | 9.30 | 1.49700 | 81.6 |
| 2 | −294.215 | 0.30 | | |
| 3 | 54.539 | 12.96 | 1.43387 | 95.2 |
| 4 | 854.847 | 1.18 | | |
| 5 | −2403.320 | 3.70 | 1.83400 | 37.2 |
| 6 | 126.233 | 33.28 | | |
| 7 | 115.068 | 6.74 | 1.80518 | 25.4 |
| 8 | −81.765 | 2.80 | 1.72000 | 42.0 |
| 9 | 44.520 | 4.55 | | |
| 10 | −3516.110 | 2.20 | 1.77250 | 49.6 |
| 11 | 89.638 | 4.00 | | |
| 12 | 89.930 | 6.30 | 1.48749 | 70.2 |
| 13 | −136.181 | 0.10 | | |
| 14 | 53.595 | 8.68 | 1.58900 | 48.6 |
| 15 | −78.856 | 2.20 | 1.80518 | 25.4 |
| 16 | 439.762 | 7.51 | | |
| 17 | 866.748 | 3.40 | 1.56732 | 42.8 |
| 18 | −72.819 | 6.50 | | |
| 19 | −63.640 | 2.10 | 1.77250 | 49.6 |
| 20 | 59.960 | 24.50 | | |
| 21 | 69.898 | 3.50 | 1.72825 | 28.5 |
| 22 | 160.599 | | | |

Conditional Expression $f/f_1 = 2.0222$     (5)

$f/f_{12} = -0.5401$     (6)

$f/f_{123} = 1.9599$     (7)

$f/R_{3-1} = 3.335$     (8)

$|R_{3-1}/R_{3-2}| = 0.6603$     (9)

$d_{23}/f = 0.013$     (10)

Coefficient $\alpha = -0.40$

Given that an inclination of the whole lens system is 1°, a moving amount of the third lens group III in order to compensate an image blur caused by the inclination is 2.092 mm.

The transverse aberration in an inclined state of the lens system by 0° in Example 4 and the transverse aberration in a state where the image blur is compensated by moving the third lens group III with respect to the inclination of 1° are shown in FIGS. 19A, 19B and 20A-20C, respectively.

What is claimed is:

1. An image blur compensating telephotographic lens comprising:
   four lens groups, comprising a first lens group having a positive power, a second lens group having a negative power, a third lens group having a positive power, and a fourth lens group having a negative power arranged in this order from an object side; and
   a lens moving mechanism for moving one of said second lens group or said third lens group in a direction vertical to the optical axis in order to compensate for an image blur when a photograph is taken.

2. An image blur compensating telephotographic lens comprising:
   four lens groups, comprising a first lens group having a positive power, a second lens group having a negative power, a third lens group having a positive power, and a fourth lens group having a negative power arranged in this order from an object side; and
   a lens moving mechanism for moving said second lens group in a direction vertical to the optical axis in order to compensate for an image blur when a photograph is taken, in which the following relations are satisfied:

$$1.5 < f/f_1$$

$$-f/f_1 < f/f_{12} < 0,$$

wherein $f_1$ denotes a focal length of said first lens group, $f_{12}$ denotes a composite focal length of said first and said second lens groups, and f denotes a focal length of said whole telephotographic lens.

3. An image blur compensating telephotographic lens according to claim 2, wherein said second lens group comprises at least one positive lens piece and two negative lens pieces in which a radius of curvature of a surface nearest to the object is represented by $R_{2-1}$, so that the following relation is satisfied:

$$-0.5 < f/R_{2-1} < 4.0.$$

4. An image blur compensating telephotographic lens according to claim 3, further including a near distance focusing mechanism for moving at least a part of said fourth lens group in the direction along the optical axis in order to preform a focusing operation with respect to a near distance object.

5. An image blur compensating telephotographic lens according to claim 2, wherein said second and third lens groups are disposed in such a manner as to be proximate the direction of the optical axis, in which a distance between said second and third lens groups is represented by $d_{23}$, so that the following relation is satisfied:

$$d_{23}/f < 0.1.$$

6. An image blur compensating telephotographic lens according to claim 5, further including a near distance focusing mechanism for moving at least a part of said fourth lens group in the direction along the optical axis in order to preform a focusing operation with respect to a near distance object.

7. An image blur compensating telephotographic lens according to claim 2, further including a near distance focusing mechanism for moving at least a part of said fourth lens group in the direction along the optical axis in order to perform a focusing operation with respect to a near distance object.

8. An image blur compensating telephotographic lens comprising:

four lens groups, comprising a first lens group having a positive power, a second lens group having a negative power, a third lens group having a positive power, and a fourth lens group having a negative power arranged in this order from an object side; and a lens moving mechanism for moving said third lens group in a direction vertical to the optical axis in order to compensate an image blur when a photograph is taken, in which the following relations are satisfied:

$1.5 < f/f_1$ $f/f_{12} < -0.2$ $1.5 < f/f_{123}$ wherein $f_1$ denotes a focal length of said first lens group, $f_{12}$ denotes a composite focal length of said first and second lens groups, $f_{123}$ denotes a composite focal length from said first lens group to said third lens group, and f denotes a focal length of said whole telephotographic lens.

9. An image blur compensating telephotographic lens according to claim 8, wherein said third lens group comprises at least two positive lens pieces and one negative lens piece, a lens nearest to said object in said third lens group is a double convex positive lens, in which a radius of curvature of an object side surface is represented by $R_{3-1}$ and the radius of curvature of an image side surface is represented by $R_{3-2}$, so that the following relations are satisfied:

$2.0 < f/R_{3-1} < 5.0$ $|R_{3-1}/R_{3-2}| < 0.9$.

10. An image blur compensating telephotographic lens according to claim 8, wherein said second and third lens groups are disposed in such a manner as to be proximate a direction of the optical axis, in which the distance between said second and third lens groups is represented by $d_{23}$, so that the following relation is satisfied:

$d_{23}/f < 0.1$.

11. An image blur compensating telephotographic lens according to claim 8, further including a near distance focusing mechanism for moving at least a part of said fourth lens group in the direction along the optical axis in order to perform a focusing operation with respect to a near distance object.

* * * * *

UNITED STATES PATENT AND TRADEMARK OFFICE
CERTIFICATE OF CORRECTION

PATENT NO. : 5,121,978
DATED : June 16, 1992
INVENTOR(S) : K. MARUYAMA

It is certified that error appears in the above-indentified patent and that said Letters Patent is hereby corrected as shown below:

On the title page, item [57], "References Cited", "FOREIGN PATENT DOCUMENTS", insert ---63-201623  8/1988 Japan---.

At column 12, line 50 (claim 4, line 5), change "preform" to ---perform---.

At column 12, line 65 (claim 6, line 5), change "preform" to ---perform---.

Signed and Sealed this

Fifteenth Day of October, 1996

Attest:

BRUCE LEHMAN

*Attesting Officer*   *Commissioner of Patents and Trademarks*